April 8, 1941.  O. KRASTEL  2,237,786
REAR-SHUTTER MECHANISM FOR MOVING PICTURE PROJECTING MACHINES
Filed Dec. 7, 1937  2 Sheets-Sheet 1
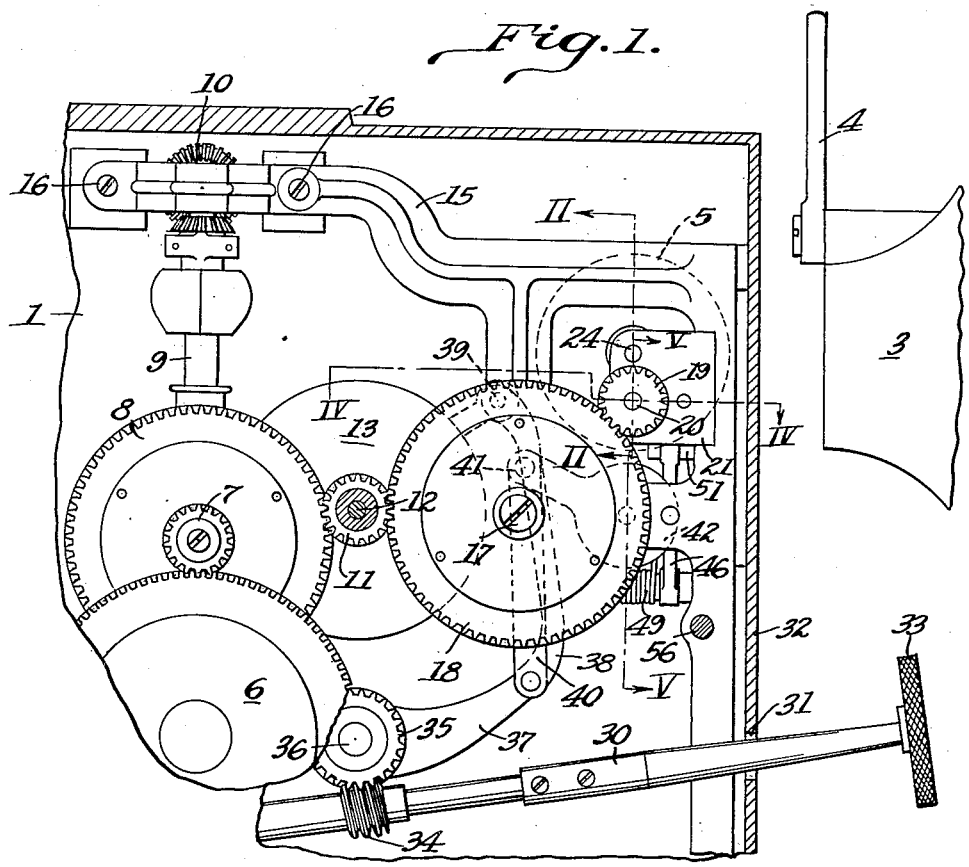
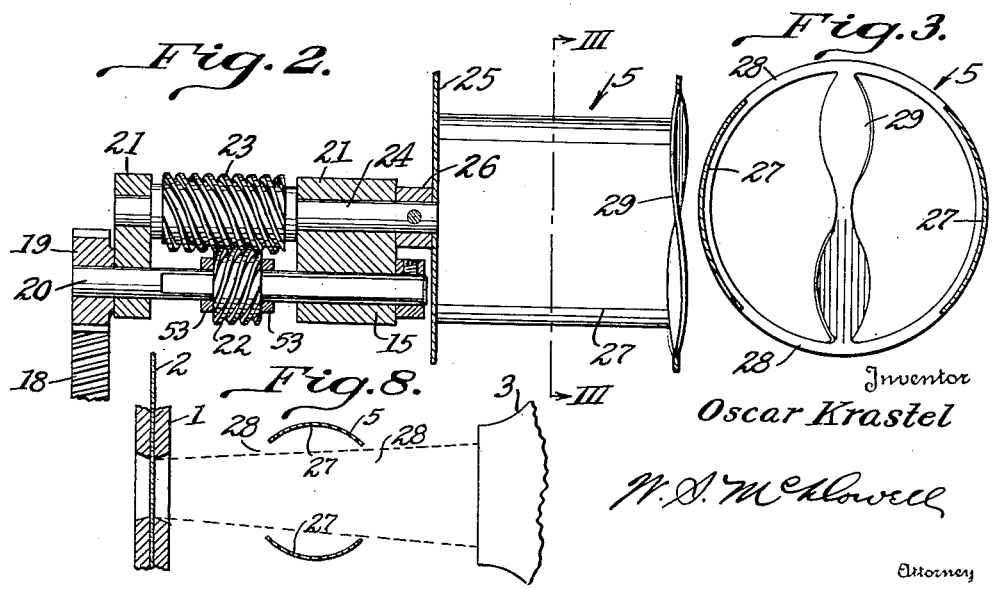
Inventor
Oscar Krastel
W. S. McDowell
Attorney

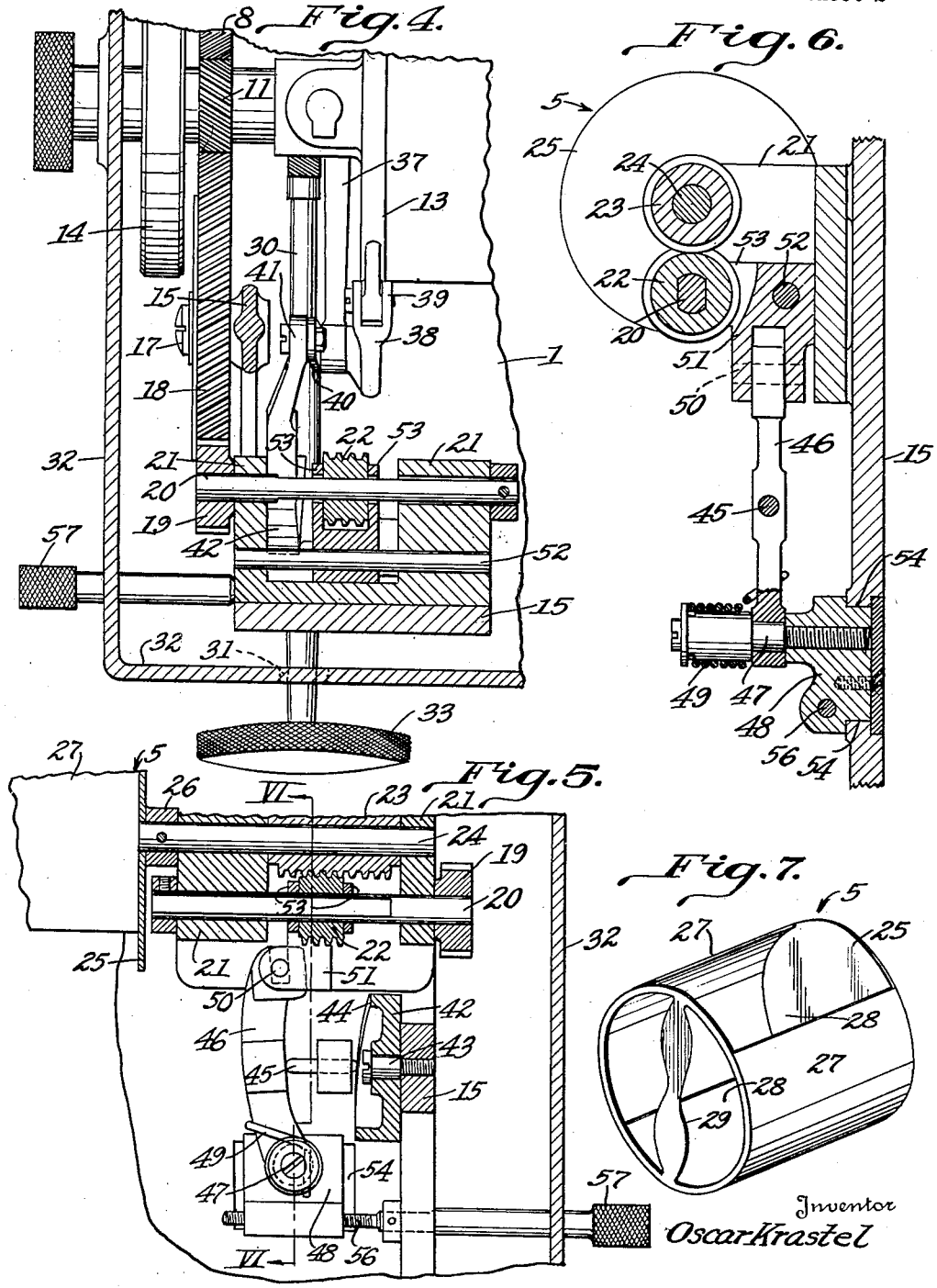

Patented Apr. 8, 1941

2,237,786

UNITED STATES PATENT OFFICE 2,237,786

REAR-SHUTTER MECHANISM FOR MOVING PICTURE PROJECTING MACHINES

Oscar Krastel, Columbus, Ohio, assignor to The L. J. Gardiner Company, Columbus, Ohio, a corporation of Ohio Application December 7, 1937, Serial No. 178,552

4 Claims. (Cl. 88—19.3)

This invention relates to motion picture projecting apparatus and more particularly to an improved shutter mechanism for such apparatus, the said shutter mechanism being of the type which is disposed between the source of the projection light and the motion picture film and functioning in the dual capacity of arresting light passage to the film when the latter is in motion and to effect further periodic interception of the light beam in order to reduce the heat of the beam reaching the film to such a low degree as to remove the possibility of film combustion.

The rear-shutter mechanisms hitherto proposed comprise bladed members rotatably mounted on shafts which extend longitudinally of the projecting head or frame of the machine at one side thereof, such longitudinal shafts being driven by relatively small miter gears driven by the main drive gearing of the machine. The employment of the radially-bladed rear-shutter mechanism and the elongated longitudinally extending shafts required for the rotatable support therefor has resulted in considerable vibration as well as excessive wear on the part of the drive gearing, causing such machines to become noisy in operation and require frequent repairs. Thus in most standard machines involving the front shutter mechanisms, it is customary to use fiber gears to drive the same in order to minimize noise but in the rear-shutter mechanisms now proposed, such fiber gears have been found to be impractical because of excessive wear and metal gears have been substituted therefor, the noise of the latter having been overlooked in an attempt to obtain gears of greater durability and longer life.

The main object of the present invention is to provide a simple, compact silently operating rear-shutter mechanism which may be applied with but minimum change to standard types of motion picture projectors, there being a drive means for such rear-shutter mechanism of improved construction and so designed as to be capable of operating without detrimental wear or causing noisy operation.

Another object of the invention resides in the provision of a rear shutter mechanism which is mounted for rotation about an axis disposed transversely of the projecting head or frame of the machine, eliminating the use of the elongated longitudinally extending shutter shafts of the prior art.

A further object of the invention rests in a rear shutter having a cylindrical body containing a pair of spaced arcuate shutter bars arranged for rotation in the path of light projection to intercept the light beams issuing from the light hood or cone of the machine.

A still further object resides in rotating the rear shutter by mechanism actuated by the intermittent drive employed for effecting movement of film through the projecting head of the machine.

A still further object resides in the provision of means for synchronizing the operation of the rear-shutter mechanism with respect to the movement of the film, the synchronizing means being disposed primarily on the transverse shafting on which the rear shutter is mounted.

With the above and other objects in view, the invention consists in the construction and combinations of parts substantially as hereinafter described and claimed.

In the accompanying drawings, which illustrate the preferred form of the present invention:

Fig. 1 is a view in side elevation illustrating the drive gearing of a motion picture projecting machine and the gearing associated therewith for driving the rear-shutter mechanism forming the present invention;

Fig. 2 is a vertical sectional view on the plane indicated by the line II—II of Fig. 1 and disclosing the driving gears for the rear-shutter mechanism, the latter being illustrated in longitudinal cross section;

Fig. 3 is a transverse vertical sectional view taken through the rear shutter comprising the present invention on the plane indicated by the line III—III of Fig. 2;

Fig. 4 is a detail horizontal sectional view, the plane of the figure being indicated by the line IV—IV of Fig. 1, the figure illustrating the drive mechanism for the rear shutter and the accompanying means for framing or synchronizing the rear shutter with the movement of the film;

Fig. 5 is a vertical section on the line V—V of Fig. 1 showing the shutter framing gears and the mechanism for adjusting the same;

Fig. 6 is a detail vertical sectional view on the plane indicated by the line VI—VI of Fig. 5;

Fig. 7 is a detail perspective view of the rear-shutter employed by the present invention;

Fig. 8 is a diagrammatic view illustrating the position of the rear shutter with respect to the path of light projection of the machine.

This description may be prefaced by stating that the present invention is readily applicable to most standard types of motion picture projecting machines and, therefore, since this invention is specifically directed to an improved type of rear-shutter mechanism and the driving and adjusting means therefor, it is deemed unnecessary to describe in detail the construction of such projection apparatus except as to the details thereof which enter into the present invention.

Thus, in the drawings, the numeral 1 designates in its entirety the projection head of a motion picture machine through which a film 2 is advanced in the usual intermittent manner. The light hood or cone of the machine, is indicated at 3, the said hood or cone housing the usual light source and condensing lens, said hood being provided with the customary dowser, indicated at 4. It will be understood that an intense beam of light issues from the aperture of the hood or cone 3 and is concentrated on the individual frames of the film 2, as the latter moves intermittently through the head 1. The rear-shutter mechanism 5, constituting the present invention, is disposed in the path of light projection between the film 2 and the hood or cone 3, so that as the film is being moved to present successive frames to the projecting position, the light beam is intercepted and while during projection or dwell of a given frame of the film, the light beam is also momentarily intercepted by the operation of the shutter 5 to lower the temperature of the film and to mitigate the effects of the high temperature of the light beam.

Standard gearing is disclosed in Fig. 1 of the drawings for causing the intermittent advance of the film 2 through the projecting head. Thus the numeral 6 designates the main drive gear of a conventional projector, the said gear being suitably driven in a customary manner. The gear 6 meshes with a pinion 7 with which is connected an enlarged gear 8. On the inner side of the gear 8, the latter is provided with a beveled gear ring, not shown, which meshes with a beveled pinion fixed to the lower end of a vertical shaft 9, suitably supported in bearings carried in connection with the side frame of the head 1. The upper end of the shaft 9 is connected with gearing 10 employed to drive the film feed sprockets.

Meshing with the gear 8 is a pinion 11 mounted on the shaft 12 of an intermittent gear case 13 and which is employed, as usual, to impart intermittent rotary movement to the film engaging sprockets also employed in advancing the film through the machine, the shaft 12 being further equipped with a flywheel 14, as shown in Fig. 4. All of these parts, with the exception of the rear shutter 5, are of standard construction and function in the customary manner and of themselves form no part of the present invention; accordingly, a more extended explanation thereof will be omitted.

The parts comprising the present invention consist essentially of a supplemental supporting bracket 15 which is attached by means of the standard screws 16 to the side frame of the head 1, the screws 16 being ordinarily employed in holding a bearing bracket to the upper end of the shaft 9. The bracket 15 is therefore stationarily connected with the side frame of the head 1 and has its lower portion, not shown, stationarily secured to the base portion of the head 1.

Fixed to rotate on a stud shaft 17, carried by the bracket 15, is an idler gear 18, preferably of a composition material such as highly pressed fiber, the gear 18 being a duplicate of the gear 8. Meshing with the teeth of the gear 18 is a pinion 19 of the same size and number of teeth as the pinion 11. The pinion 19 is carried by the outer end of a shaft 20, rotatably supported in bearings 21 formed with the bracket 15. The shaft 20 extends transversely of the general plane of the projecting head 1 and carries a worm gear 22, the latter being rotatable in unison with the shaft 20 but adjustable longitudinally thereon, by a mechanism hereinafter described, the longitudinal adjustment of the gear 22 on its shaft being performed in order to control the "framing" or synchronization of the rear shutter 5 with the movements of the picture film 2, as is customary in projection apparatus of this type.

Meshing with the worm gear 22 is a corresponding gear 23 of greater length, the latter being fixed upon the shutter shaft 24. This shaft is disposed above the shaft 20 in parallel relation therewith, and is mounted for rotation in the bearings 21.

Fixed to one end of the shaft 24 and arranged in the path of light projection from the hood or cone 3 is the shutter 5. In the present instance, this shutter comprises a metallic symmetrical body of light weight and possessing generally a cylindrical outline, the same rotating about the longitudinal axis of the shaft 24. In the specific form of the shutter herein illustrated, the same comprises an inner disk 25 formed centrally with a hub 26 which is secured to the shaft 24. Extending longitudinally from the peripheral portion of the disk 25 and in parallel and spaced relationship with respect to each other is a pair of transversely arcuate, opaque, shutter bars 27—27. Each of these bars occupies substantially 90° of the full circular outline of the shutter, leaving slots or light openings 28 therebetween, providing for the passage of light through the shutter when the bars 27 are out of intercepting relationship therewith. The rear shutter is timed to rotate so that during movement of the film through the head 1 to successively present different pictures, the light beam is intercepted to conceal the film motion and also, the speed of rotation of the shutter is such that during exposure of a given picture of the film, the light beam is again intercepted, while the film is at rest, to relieve the film fleetingly of the intense heat of the light beam so that the temperature of the film will not reach a point constituting a fire hazard. In this regard, the outer end of the shutter is formed to comprise a fan blade 29, which revolves in unison with the shutter and effects circulation of heated air currents outwardly and longitudinally of the shutter to further dissipate the heat of the light beam and maintain desired operating temperatures.

The adjustment of the worm gear 22, to synchronize the frame shutter with the operation of the film, is accomplished by conventional means. As shown in Fig. 1, a manually rotated shaft 30, suitably journaled in connection with the side of the head 1, projects through an opening 31 in one of the vertical walls of the casing 32 surrounding the projector, and has its outer end equipped with a hand wheel or knob 33.

The inner portion of the shaft 30 is formed with worm teeth 34 which mesh with correspondingly formed teeth of a worm gear 35. This worm gear is connected with a rock shaft 36 provided with a crank arm 37. A link 38 has its lower end pivotally connected with the outer end of the crank arm 37 and its upper end pivotally connected as at 39 to a projection extending radially from the intermittent gear case 13, as is customary in machines of this type. Also connected with the outer end of the arm 37 is the lower end of a second link 40. The upper end of the link 40 is connected with a crank extension 41 formed with a cam disk 42, the latter being rotatably supported by means of an axial stud 43 carried by the bracket 15. The peripheral cam flange 44 of the disk 42 engages with a slidable fulcruming pin 45, one end of the pin being in contact with the flange 44 while the other end thereof contacts with the intermediate portion of a lever 46.

The lower end of the lever 46 is mounted for pivotal movement on a stud 47 which is carried by a block 48 slidably mounted in a slot provided therefor in the side of the bracket 15. The outer end of the stud 47 is connected with a coil spring 49, the free end of the spring being engaged with the lever 46 so as to normally force the latter toward the pin 45 and to maintain the pin, in turn, in contact with the cam flange 44.

The upper end of the lever 46 is slotted to receive a transverse pin 50 positioned in a carriage 51, this carriage being supported for sliding movement on a rod 52 fixed to the bracket 15, the said carriage including ears 53 which engage the opposite ends of the worm gear 22. Thus the worm gear 22 in its ordinary function constitutes the usual shutter drive and also acts as the framing gear employed in standard machines of this type to rotate the shutter a limited amount when the film is being framed. The gear 22 can be reciprocated along the shaft 20 without being rotated so as to frame the shutter 5. This mechanism, except for its position, is common in the art of projecting machines. By the rotation of the shaft 30, simultaneous adjustment can thus be imparted to the intermittent gear mechanism and the framing gear.

An additional adjustment of the framing gear independently of the intermittent gearing is obtainable by varying the position of the block 48 upon which the lower end of the lever 46 is fulcrumed. As previously stated, the block 48 is slidably mounted in an opening, indicated at 54, in the side of the bracket 15 and is slidably supported in said opening. The block 48 is formed with a longitudinally extending threaded bore which receives a screw shaft 56, the latter being suitably journaled for rotation in connection with the bracket 15 and is provided with an external actuating portion 57, as shown in Fig. 5, projecting beyond the external housing or casing 32 of the machine. By varying the fulcrum center for the lower end of the lever 46 by means of the sliding block 48, it will be seen that the framing gear 22 may be moved back and forth on a shaft independently of the movement normally afforded by the rotation of the cam 42.

In view of the foregoing, it will be seen that the present invention provides a rear-shutter mechanism for motion picture projectors wherein the rear-shutter is mounted to rotate about an axis extending transversely of the frame of the projector, the shutter proper being driven from the intermittent drive for advancing the motion picture film through the projector. The construction lends itself to convenience and facility in manufacture, quietness in operation, freedom from vibration and premature wear or early mechanical deterioration.

While the invention has been described in detail as to one of its preferred forms, it is not to be limited to such details and forms since many changes and modifications may be made without departing from the spirit and scope of the invention in its broader aspects. Hence it is desired to cover any and all forms of the invention which may come within the language or scope of the following claims.

What is claimed is:

1. In motion picture projection apparatus of the type having a light source, a projection head and an intermittent drive for the film passing through said head, a pair of spaced parallel shafts extending transversely of said head, a shutter carried by the first of said shafts, said shutter being disposed between the light source and the film, intermeshing gears of unequal length carried by said shafts, the shorter of said gears being movable longitudinally on the shaft therefor, motion transmitting means connecting the second shaft with the intermittent drive, means for moving the shorter gear on its shaft to vary the position of said shutter with respect to said intermittent drive having a pivotally mounted lever, means for transmitting movement from said lever to said gear, spring means for moving said lever in one direction, cam means disposed adjacent said lever for imparting movement thereto in opposition to said spring, and means for imparting movement to said cam means.

2. In motion picture projecting apparatus of the type having a light source, a projection head and an intermittent drive for the film passing through said head, a pair of spaced parallel shafts extending transversely of said head, a shutter secured to one of said shafts, said shutter being disposed between the light source and the film, intermeshing gears of unequal length carried by said shafts, the shorter of said gears being movable longitudinally on the shaft therefor, motion transmitting means connecting the second shaft with the intermittent drive, means for moving the shorter gear on its shaft to vary the position of said shutter with relation to the intermittent drive having a pivoted lever, means for transmitting motion from said lever to said shorter gear, cam means pivotally supported adjacent said lever, said cam means serving to impart movement to said lever upon pivotal movement thereof, spring means for yieldably resisting movement of said lever by said cam, a rotatable member carried by said head, an arm mounted for movement with said rotatable member, a pair of links connecting said arm with said intermittent drive and said cam respectively, and means extending to the exterior of said head for imparting movement to said rotatable member.

3. In motion picture projecting mechanism of the type having a projection head, a shutter, driving means for said shutter including a pair of gears of unequal length and means for adjusting said shutter having a lever, motion transmitting means connecting said lever and one of said gears, and cam means for imparting movement to said lever; means for supporting said lever comprising a block, means for pivotally mounting said lever on said block, guide means securing said block to said projection head for adjustment in a direction parallel to that of the movement imparted to said lever by said cam means, and means provided on said head for moving said block to impart pivotal movement to said lever to effect adjustment of said gear and shutter independently of movement of said cam means.

4. In motion picture projecting mechanism of the type having a projection head, a shutter, driving means for said shutter including a pair of gears of unequal length and means for adjusting said shutter having a lever, motion transmitting means connecting said lever and one of said gears, and cam means for imparting movement to said lever; means for supporting said lever comprising a block, means for pivotally mounting said lever on said block, spring means disposed between said lever and block to yieldably resist movement of the former in response to the force applied by said cam means, guide means securing said block to said projection head for adjustment in a direction parallel to that of the movement imparted to said lever by said cam means, and means provided on said head for moving said block to impart pivotal movement to said lever to effect adjustment of said gear and shutter independently of movement of said cam means.

OSCAR KRASTEL.